(12) United States Patent
Ruta

(10) Patent No.: US 10,376,092 B2
(45) Date of Patent: Aug. 13, 2019

(54) COFFEE TAMPER WITH STEP DESIGN

(71) Applicant: PULLMAN ESPRESSO ACCESSORIES, St Panorama, SA (AU)

(72) Inventor: Mark Ruta, St Panorama (AU)

(73) Assignee: PULLMAN ESPRESSO ACCESSORIES, Panorama, SA (AU)

(*) Notice: Subject to any disclaimer, the term of this patent is extended or adjusted under 35 U.S.C. 154(b) by 362 days.

(21) Appl. No.: 15/501,153

(22) PCT Filed: Aug. 6, 2015

(86) PCT No.: PCT/AU2015/000468
§ 371 (c)(1),
(2) Date: Feb. 1, 2017

(87) PCT Pub. No.: WO2016/019418
PCT Pub. Date: Feb. 11, 2016

(65) Prior Publication Data
US 2017/0215630 A1 Aug. 3, 2017

(30) Foreign Application Priority Data
Aug. 8, 2014 (AU) .................. 2014903081

(51) Int. Cl.
A47J 31/44 (2006.01)
B30B 9/04 (2006.01)
B30B 9/30 (2006.01)

(52) U.S. Cl.
CPC ............ A47J 31/44 (2013.01); B30B 9/04 (2013.01); B30B 9/3021 (2013.01)

(58) Field of Classification Search
CPC . A47J 31/20; A47J 31/38; A47J 31/44; A47G 19/16; B30B 9/3021; B30B 9/04; B30B 9/06
(Continued)

(56) References Cited

U.S. PATENT DOCUMENTS 5,526,733 A 6/1996 Klawuhn et al.
D493,338 S 7/2004 Scott
(Continued)

FOREIGN PATENT DOCUMENTS

CN 203182711 9/2013
DE 202010004628 7/2010

OTHER PUBLICATIONS

Website https://web.archive.org/web/2014062005915/http://www.mattperger.com/Pergtamp Retrieved from Internet Wayback Machine on Mar. 27, 2017, Published on Jun. 22, 2014 as per Wayback Machine, 10 Pages, "Pergtamp".
(Continued)

Primary Examiner — Jimmy T Nguyen
(74) Attorney, Agent, or Firm — Brooks Kushman P.C.

(57) ABSTRACT

A handheld coffee tamper having a circular tamper base, connected to a handle, wherein the cross section design of the circular tamper base has a stepped configuration where the base of the tamper and the first rise of the first step has a sharp edge having a radius of less than 0.2 mm, where the rise of the first step is between 0.5 to 4.0 mm and the run of the first step is between 0.05 to 2.0 mm and where the second step forms the side wall of the tamper, where the side wall is at least 5.0 mm in height, and where tamper base has a Rockwell hardness of at least 25.

7 Claims, 1 Drawing Sheet

Figure 1:
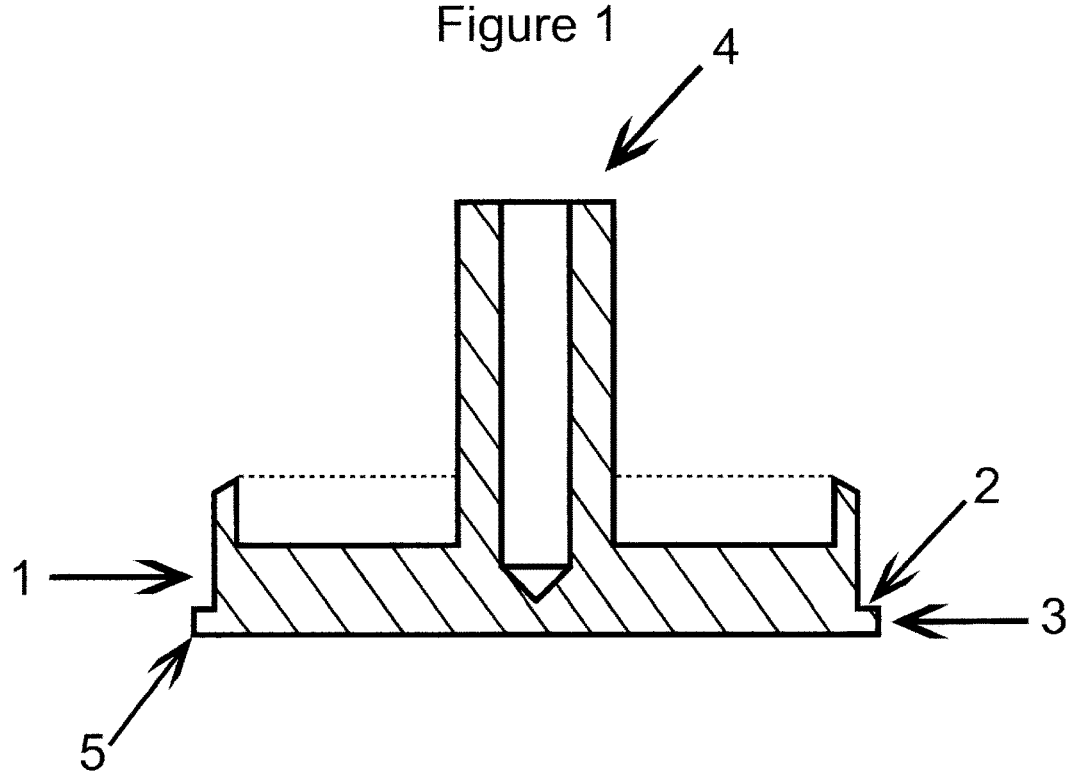

(58) Field of Classification Search
USPC .................. 100/265, 295; 99/283, 287, 295;
241/168, 169, 169.2; 425/424, 425, 428,
425/469
See application file for complete search history.

(56) References Cited

U.S. PATENT DOCUMENTS

| | | | | |
|---|---|---|---|---|
| 7,325,491 | B2* | 2/2008 | Petiziol ................... | A47J 31/44 100/219 |
| 2004/0206243 | A1* | 10/2004 | Foster ..................... | A47J 31/44 99/279 |
| 2005/0132890 | A1* | 6/2005 | Constantine ............ | A47J 31/44 99/275 |
| 2008/0296532 | A1* | 12/2008 | Kuno ...................... | B29C 33/56 252/182.33 |
| 2011/0056385 | A1* | 3/2011 | McLean .................. | A47J 31/20 99/297 |
| 2014/0234494 | A1* | 8/2014 | Doglioni Majer .... | A47J 31/369 426/115 |
| 2015/0196158 | A1* | 7/2015 | Velasquez ............... | A47J 31/38 99/297 |

OTHER PUBLICATIONS

International Search Report for PCT/AU2015/000468, Completed by the Australian Patent Office on Sep. 30, 2015, 4 Pages.

* cited by examiner

COFFEE TAMPER WITH STEP DESIGN

CROSS-REFERENCE TO RELATED APPLICATION

This application is the U.S. national phase of PCT Application No. PCT/AU2015/000468 filed on Aug. 6, 2015, which claims priority to AU Patent Application No. 2014903081 filed on Aug. 8, 2014, the disclosures of which are incorporated in their entirety by reference herein.

TECHNICAL FIELD

The invention relates to a high quality hand held coffee tamper having a stepped cross sectional design.

BACKGROUND ART

The following descriptions are provided to assist the reader to understand the relevance of the invention. However the background art is not intended and do not of themselves provide any admission by the applicant that they are published as may be required for an assessment of novelty or obviousness or are common general knowledge according to the laws of and in any particular country in the world.

The current invention relates to hand held coffee tampers. In the coffee world, a tamper is used to compress coffee grounds in the coffee ground basket/filter of a coffee espresso machine. Compressing the coffee grounds in the basket/filter helps to create the required pressure to allow more of the oils from the ground coffee to enter the cup, providing the intense flavour of espresso.

The preparation of espresso coffee involves running hot water through the compressed coffee grounds in order to deliver a desired serving of concentrated espresso coffee.

It is well known in the art, the amount of compression of the coffee grounds to form a coffee cake influences the quality of the espresso produced.

The compression of the coffee grounds in the coffee ground basket/filter to form the coffee cake is known as tamping, and is performed by devices known as tampers.

Many expert espresso coffee makers or baristas use a simple hand held tamper. These tampers usually consist of a circular tamping base for compressing the coffee grounds, and a handle attached to the base for the operator to hold the tamper. The circular tamper base has a diameter slightly smaller than the internal diameter of the coffee ground basket/filter. Ideally the tamper fits snugly into coffee ground basket/filter so even the coffee grounds near the edge of the coffee ground basket/filter are also compressed. Good quality hand held tampers are usually made from a high quality steel, and have perpendicular sides of at least 2 to 3 mm to give the tamper suitable strength. A problem with existing tampers, is that when they fit snugly in the coffee ground basket/filter which is desirable, when the tamper is removed, a vacuum is created that can create cracks or damage the coffee cake in some other way. The other issue is the coffee tamper binds or grabs the filter basket and jams. If the side of the tamper base is too thin then the tamper is often prone to be damaged from constant use.

Thus at least one object of this invention is to provide a hand held coffee tamper that alleviates or reduces the problems found with current hand held tampers.

SUMMARY OF INVENTION

In one form of this invention although this need not be the only or indeed the broadest of this, there is provided a handheld coffee tamper having a circular tamper base, connected to a handle, characterised, in that the cross section design of the circular tamper base has a stepped configuration where the base of the tamper and the first rise of the first step has a sharp edge having a radius of less than 0.2 mm, where the rise of the first step is between 0.5 to 4.0 mm and the run of the first step is between 0.05 to 2.0 mm and where the second step forms the side wall of the tamper, where the side wall is at least 5.0 mm in height, and where tamper base has a Rockwell hardness of at least 25.

By having the tamper base where the side wall is stepped as defined above, this allows the user to compress or tamp the coffee without causing the tamper base to bind or jam in the filter basket and also remove the tamper allowing air to flow in and thus not creating a vacuum. There is no known tamper that uses a steel of this hardness or has an edge of this sharpness. However the inventors have found that it is desirable to have a tamper with a very sharp edge, and to have an edge of this sharpness and to have the tamper base of a stepped configuration that reduces the incident of creating a vacuum when the tamper is removed and jamming when the tamper is compressing the coffee, it is preferable to have the tamper made from an exceptionally hard material.

U.S. design Pat. USD493338 discloses a hand held tamper where the tamper base is angled. This design appears to be entirely aesthetic and gives no indication to the material strength or edge sharpness. If this tamper was made with materials commonly used for tampers, it is not expected it would be sufficiently robust for use by professional baristas.

The inventor has found that by making the tamper with a material that is much harder than found with current tampers, the design can be altered to make the tamper more robust but also more functional by having the stepped wall design.

Preferably the tamper base is made from a stainless steel.

Preferably the tamper base is made using 431 stainless steel and subjected to a hardening process to bring the Rockwell hardness of the stainless steel to a minimum 25.

More preferably the tamper base has a Rockwell hardness of at least 40.

More preferably the tamper base has a Rockwell hardness of at least 48.

Preferably the tamper base has a tolerance of no more than a 0.15 mm gap between the base and the coffee ground basket/filter.

Preferably the tamper provides a tamped surface of no less than 99.6% relative to the surface area of the coffee grounds to be tamped in the coffee ground basket/filter.

Preferably the tamper base that comes into contact with the coffee grounds, is coated with Teflon.

DETAILED DESCRIPTION OF THE INVENTION

Figure 2:
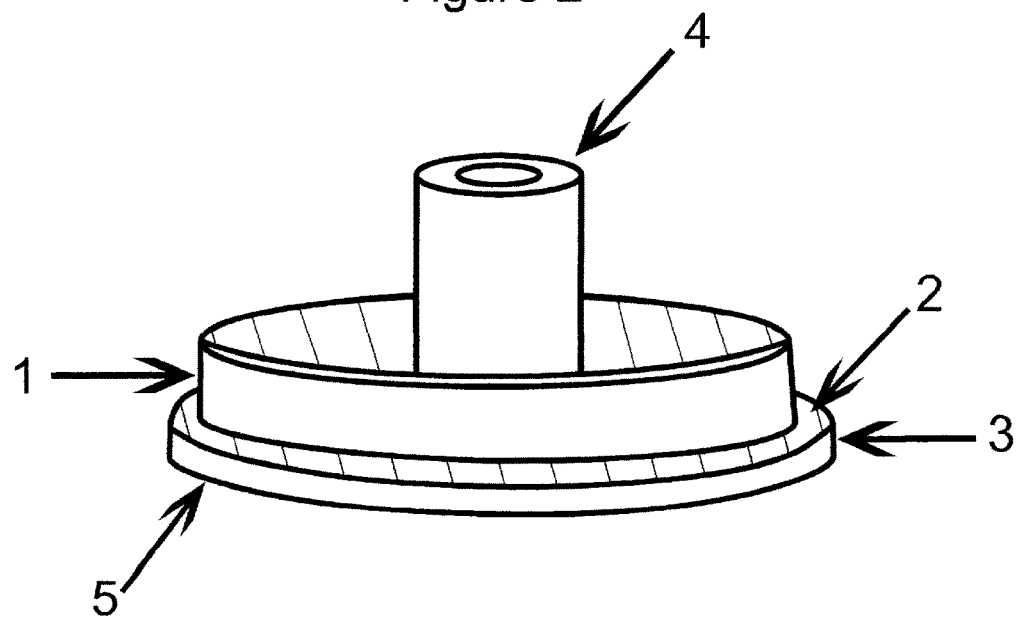

For a better understanding of the invention, further description will now be given, with reference to drawings in which:

FIG. 1 illustrates a cross sectional view of the tamper of the invention and FIG. 2 illustrates a perspective view of the tamper of the invention.

The figures show a tamper base having a sharp edge (5) with a step design having a first rise (3) and first run (2) and a side wall (1) and a means for attaching a handle (4). The tamper handle is not shown.

The invention claimed is:

1. A handheld coffee tamper comprising:

a handle; and a circular tamper base connected to the handle, a cross section of the circular tamper base having a first step and a second step, wherein the first step comprises a first rise extending from a bottom of the circular tamper base and a horizontally first run formed on a top portion of the first rise and the second step comprises a second rise extending from the first run to form a sidewall of the circular tamper base, wherein the first rise of the first step having a sharp edge having a radius of less than 0.2 mm, a height of the first rise of the first step is between 0.5 to 4.0 mm and a length of the run of the first step is between 0.05 to 2.0 mm, and wherein the sidewall of the second step is at least 5.0 mm in height, and the circular tamper base has a Rockwell hardness of at least 25.

2. The coffee tamper of claim 1, wherein the tamper base is made from a stainless steel.

3. The coffee tamper of claim 2, wherein the tamper base is subjected to a hardening process to bring the Rockwell hardness of the stainless steel to at least 25.

4. The coffee tamper of claim 1, wherein the tamper base has a Rockwell hardness of at least 40.

5. The coffee tamper of claim 1, wherein the tamper base has a Rockwell hardness of at least 48.

6. The coffee tamper of claim 1, wherein a surface of the circular tamper base that comes into contact with coffee grounds is Teflon coated.

7. The coffee tamper of claim 1, wherein the sharp edge has a radius of less than 0.1 mm.

\* \* \* \* \*